United States Patent [19]

Winkler et al.

[11] Patent Number: 4,827,599
[45] Date of Patent: May 9, 1989

[54] MACHINE TOOL

[75] Inventors: Hans-Henning Winkler, Tuttlingen; Eugen Rütschle, Mühlheim; Rudolf Haninger, Seitingen, all of Fed. Rep. of Germany

[73] Assignee: Chiron-Werke GmbH & Co. KG, Fed. Rep. of Germany

[21] Appl. No.: 234,884

[22] Filed: Aug. 22, 1988

[30] Foreign Application Priority Data

Aug. 10, 1988 [DE] Fed. Rep. of Germany ....... 3827053

[51] Int. Cl.$^4$ ............................................. B23Q 3/157
[52] U.S. Cl. ........................................ 29/568; 414/783
[58] Field of Search ...................... 29/568, 26 A, 26 R; 279/1 TS; 414/776, 779, 783; 294/106, 108, 110.1, 109; 901/31, 36, 39

[56] References Cited

U.S. PATENT DOCUMENTS

| 3,327,386 | 6/1967 | Jerue | 29/568 |
| 3,722,711 | 3/1973 | Seidel | 29/568 |
| 3,822,790 | 7/1974 | Armourell | 279/1 TS |
| 4,300,278 | 11/1981 | Nomura | 414/783 X |
| 4,338,709 | 7/1982 | Straubell | 29/26 A |

FOREIGN PATENT DOCUMENTS

| 3320874 | 12/1984 | Fed. Rep. of Germany | 29/568 |
| 2491372 | 4/1982 | France | 29/568 |
| 137676 | 9/1979 | German Democratic Rep. | 29/568 |
| 214322 | 10/1984 | German Democratic Rep. | 29/568 |
| 144944 | 11/1980 | Japan | 29/568 |
| 45834 | 3/1983 | Japan | 29/568 |
| 88236 | 5/1984 | Japan | 29/568 |
| 657954 | 4/1979 | U.S.S.R. | 29/568 |
| 703300 | 12/1979 | U.S.S.R. | 29/568 |
| 904980 | 2/1982 | U.S.S.R. | 29/568 |
| 1187949 | 10/1985 | U.S.S.R. | 29/568 |

Primary Examiner—William Briggs
Attorney, Agent, or Firm—Pretty, Schroeder Brueggemann & Clark

[57] ABSTRACT

A machine tool comprises a tool exchange mechanism for transferring various tool holders from a magazine position into a working position of a rotating spindle of the machine tool. In order to minimize tool change times for standardized and non-standardized tool holders, frictional means between the tool holders and grippers of the tool exchange mechanism are provided as well as locking mechanism for maintaining a predetermined rotational position of the tool holders in the tool exchange mechanism. Thus, the tool holders may be inserted into the rotating receiving opening of the spindle with a predetermined rotational position or, if the tool holder rotational position deviates from another predetermined rotational position of the rotating spindle, the search time for establishing a form-locking driving relation between the spindle and the tool holder is minimized.

9 Claims, 5 Drawing Sheets

MACHINE TOOL

The present invention relates to a machine tool and, more specifically, to a tool holder exchange mechanism for such machine tools.

From the prior art machine tools are known which are referred to as machining centers for performing milling and drilling operations on workpieces. In one of the prior art machining centers a spindle is used having a vertical spindle axis. A plurality of arms is arranged around said spindle, the arms being arranged pivotably about horizontal axes to allow both vertical and radial displacement of the free ends of the arms. The free ends are equipped with grippers for holding tool holders. In a magazine position all tool holders are, thus, arranged in a ring-shaped area about the spindle and above a receiving opening of the spindle. For inserting one of the tool holders into the receiving opening, one of the arms is pivoted downwardly and radially inwardly so as to make the tool holder axis flush with the spindle axis. By relatively axially displacing placing the spindle and the arm, the tool holder is inserted into the rotating spindle receiving opening. For withdrawing tool holders from the spindle, the aforementioned steps are performed in opposite sequence and, simultaneously, another of the arms with the next tool holder to be used during the process of machining is displaced for inserting the next tool holder immediately after the first tool holder has been withdrawn from the spindle.

For making tool holder exchange times as short as possible, the grippers are designed such as to grasp the tool holders in a ring-type manner, however, still allowing the tool holders to rotate about their axes. Consequentely, any of the grippers may remain on the tool holder during the operation of the tool on the workpiece and need not to be displaced to or from the tool holder during insertion or withdrawal of the tool holder into the receiving opening of the spindle.

When a machining center of the above-mentioned kind is prepared by a working person for performing multi-step machining operations on workpieces, all of the grippers at the free ends of the arms have to be loaded with the respective tool holders, needed for performing the machining steps. In order to do so, the grippers of the prior art machining center are equipped with two claws, each defining a semi-circular section of the ring-shaped receiving opening for the tool holders. For inserting or withdrawing tool holders into or from the grippers, one or both fingers are arranged pivotably about an axis which is either parallel or perpendicular to the tool holder axis. Thus, the person equipping the machining center with the required tool holders just needs to spread the fingers apart and to insert a tool holder between these fingers in a direction which lies essentially in the plane defined by the gripper receiving opening. By closing and locking the fingers around the tool holder a ring-type receiving for the tool holders is established.

Due to the fact that the tool holders are freely rotatable in the prior art grippers, the tool holder is inserted into the spindle receiving opening in a non-defined rotary position. Therefore, the prior art machining center is equipped with an arrangement establishing a frictional contact between the gripper and the tool holder during insertion of the tool holder into the rotating spindle. The frictional contact generates a braking effect on the rotary motion of the tool holder so that a driving projection or key arranged in the rotating spindle may penetrate into a corresponding recess on the tool holder as fast as possible. If such frictional contact were not established, one would run the risk that the driving projection would touch down on a plane surface on the tool holder and rotate same endlessly without ever coming into a form-locking driving relationship between the rotating spindle and the tool holder. In order to generate the frictional contact a brake disk is arranged coaxially with the axis of the tool holder, a first circumferential area of the disk being fixed against rotation to the tool holder or the gripper, while another circumferential area of the disk gets into frictional contact with either the gripper or the tool holder during introduction of the tool holder. The brake disk is arranged below a rotary bearing, and the gripper lifts the tool holder from below into a working position such that a frictional contact is established as long as the tool holder is lifted.

Accordingly, the prior art tool holder must be provided with a rotary bearing, e.g. a ball bearing or roller bearing and this, in turn, must be provided with a brake disk which—to say it in other words—connects the cage with the inner race of the ball bearing or roller bearing during application of braking forces.

However, the users of machine tools normally wish to be able to use conventional, standardized tool holders, e.g. such provided with a morse cone according to West German DIN 228 or to ISO standards, or the like.

These standardized tool holders have in common that they are provided with annular shoulder exhibiting a downwardly tapering conical surface at least at their lower face.

However, for some applications it is desired to have the tool holder fixed in a predetermined rotary position when inserting same into the rotating spindle receiving opening. Further, one has to take into account that modern machining centres require tool holder exchange times being as short as possible which, in turn, requires substantial displacing speeds of the arm and the grippers during an exchange of tool holders. As the displacement of the tool holders between the spindle and the magazine position developes along a non-linear path, various accelerations occur during the exchange of a tool holder. Therefore, the tool holders are subject to substantial dynamic forces so that one cannot guarantee that the rotary position of a tool holder is maintained between its magazine position and its working position and vice versa.

Another prior art machining center is also equipped for automatically exchanging tool holders. This prior art machining center is also provided with a spindle having a vertical axis and a separate magazine for tool holders is arranged in lateral distance to the spindle. The magazine comprises a chain conveyor-belt and the tool holders are held in grippers which, in turn, are attached to the chain conveyor-belt being arranged in a horizontal plane. The grippers, in turn, are equipped with a substantially U-shaped receiving opening, i.e. the standardized circumferential groove of the tool holders is only grasped over a semi-circular section of the circumference.

In this prior art machining center a separate transport mechanism is arranged between the spindle and the magazine for transporting tool holders between the magazine and the spindle. The transport mechanism, in turn, may be displaced between the spindle and the magazine. The transport mechanism is equipped with a horizontally arranged arm being rotatable about a vertical axis. The arm is made symmetrical and both free ends are also equipped with U-shaped receiving openings for the tool holders. When a tool holder is to be withdrawn from the magazine, the transport mechanism is displaced to the magazine such that one of the receiving openings of the arm abuts a receiving opening of the magazine, the latter being in a predetermined transfer position. By means of a shifting device a tool holder is shifted from the U-shaped receiving opening of the magazine into the U-shaped receiving opening of the arm. Then, the arm is rotated by 180° and the tool holder is approached to the spindle receiving opening by displacing the transport mechanism such that the tool holder may be inserted into the spindle receiving opening by relatively displacing the spindle and the tool holder with respect to each other.

In this known machining center centrifugal forces are exerted on the tool holders both during movement of the endless chain conveyor-belt within the magazine and during rotation of the transport mechanism arm. The centrifugal forces tend to move the tool holders out of the U-shaped receiving openings. Therefore, the receiving openings are equipped with locking projections being arranged in front of the free ends of the tool fingers of the U-shaped receiving openings, the locking projections entering into standardized recesses of the tool holders from above and below respectively. In order to actuate the locking projections, a piston-cylinder-unit is arranged on the magazine which pivots the locking projection upwardly and downwardly respectively during a transfer of a tool holder from the magazine into the transport mechanism arm. This mechanism is designed such that the locking projections of the magazine, when actuated, press the transport mechanism arm projections downwardly so that the latter need only to be spring-loaded and need not to be equipped with a separate servo-actuating mechanism. When a tool holder is inserted into the spindle receiving opening, the transport mechanism arm projections are pressed downwardly by means of appropriate projections arranged adjacent the spindle receiving opening so that the tool holder is unlocked when pulled into the spindle receiving opening.

However, equipping the magazine of this prior art machine tool with tool holders is relatively complicated because for inserting a tool holder into a magazine gripper, the locking projections have first to be unlocked by actuating the piston-cylinder-unit before the tool holder may be inserted into the gripper. Further, another disadvantage of this prior art machine tool is that the pivoting plane of the locking projections is arranged parallel to the direction of transfer of the tool holders such that the locking projections' action may be overcome when high centrifugal forces are exerted on the tool holders. This holds true the more as the locking projections are shaped with a slope.

It is, therefore, an object of the present invention to provide for a machine tool of the above-mentioned kind in which short tool exchange times may be achieved by establishing a form-locking relationship between the tool holder and the spindle receiving opening in as short time as possible.

More specifically it is an object of the invention to increase the frictional contact between the tool holder and the gripper during introduction of the tool holder into the spindle also when standardized tool holders are used.

Another object of the invention is to provide a machine tool with a gripper remaining in rotary contact with the tool holder during working on a workpiece where a predetermined rotary position of the tool holder is maintained during transportation between a tool holder magazine and the spindle.

It is still another object of the invention to facilitate loading and unloading of tool holders to and from the magazine before and after machining operations are performed on the workpieces.

It is still another object of the invention to ensure that tool holders may only be loaded into the grippers in a predetermined rotary position.

According to the invention this object is achieved by a machine tool comprising a plurality of tool holders having an upper conical insertion section, an intermediate circumferential gripping section and a lower tool section, said gripping section being provided with an annular shoulder having a downwardly tapering lower conical frictional surface; a rotating spindle having a conical receiving opening for inserting one of said tool holders therein and having pulling means for pulling in and securing said tool holder with said inserting section into said receiving opening; a magazine containing a plurality of said tool holders; transfer means for transferring said tool holders from said magazine into said receiving opening and vice versa; gripping means attached to said transfer means for gripping said tool holders by said gripping section when being in said magazine and rotatebly holding said tool holders when inserted, pulle-in and secured into said receiving opening and working on a workpiece, said gripping means being provided with a downwardly tapering upper conical frictional surface extending parallel to said gripping section lower conical frictional surface; control means for actuating said pulling means and said transfer means such that said frictional surfaces are in contact with each other during insertion of said inserting section into said receiving section to exert a braking force on that tool holder against rotation thereof whereas said frictional surfaces are separated from each other at an axial distance during securing said tool holder in said receiving opening for allowing free rotation thereof during said working on said workpiece.

According to another aspect of the invention the object is further achieved by a machine tool, comprising a plurality of tool holders having an upper conical insertion section, an intermediate circumferential gripping section and a lower tool section, said gripping section being provided with a recess in a circumference thereof; a rotating spindle having a first conical receiving opening for inserting one of said tool holders therein and having pulling means for pulling-in and securing said tool holder with said inserting section into said first receiving opening, a stationary stop being arranged on said spindle adjacent said first receiving opening; a magazine containing a plurality of said tool holders; transfer means for transferring said tool holders from said magazine into said first receiving opening and vice versa; gripping means attached to said transfer means for gripping said tool holders by said gripping sections when being in said magazine and rotatebly holding said tool holders when inserted, pulled-in and secured into said first receiving opening and working on a workpiece, said gripping means being provided with two claws being arranged pivotally about a first axis with respect to each other and defining an essentially circular second circumferential receiving opening for said gripping section; locking means arranged in said gripping means for keeping said tool holder in a predetermined rotational position with respect to said gripping means, said locking means comprising a spring-biased locking lever pivotable about a second axis and having a first section entering into said recess of said tool holder when said locking lever is in a first working position with said spring relaxed, said locking lever further having a second section coming into contact with said stationary stop when said insertion section is introduced into said first receiving opening to pivot said locking lever against said spring into a second working position to withdraw said first section from said recess, said locking lever further having a third section being manually displaceable to also withdraw said first section from said recess, said third section being distant from said first section.

According to another aspect of the invention said tool holder is inserted into said gripping means along a predetermined direction when said claws are spread apart and said first section is pivoted in a plane being arranged perpendicularly to said predetermined direction.

According to still another aspect of the invention of said claws is provided with a locking bar, having a path of displacement when said one claw is pivoted about said first axis, said path of displacement intersecting said locking lever except when said locking lever is in said first working position.

A first advantage of the invention is that the braking effect explained above in connection with prior art grippers is now achieved also with standardized tool holders and because the latter do not have be modified since the gripper is adapted to the standardized geometry of the tool holder. The rotary bearing of the prior art gripper is replaced in the case of the gripper according to the invention by the fact that, in the gripper according to the invention by the fact that, in the working position, the tool holder is lifted off the holding part of the gripper by an air gap so that in the working position the tool holder is permitted to rotate freely relative to the gripper without any friction at any desired speed. Considering that due to the existing air gap the friction force is reduced to zero, the gripper according to the invention can be used with particular advantage for handling tool holders of the type revolving at extremely high speeds of, say, several tenthousand rpm. In the case of such applications, which are encountered in particular in grinding and high-speed milling, the known ball bearings or roller bearings may be a problem because even the small residual frictional resistances of these rotary bearings may make themselves felt notably at these extremely high speeds.

Thus, the invention achieves much more than simply adapting the known gripper to known and standardized tool holders, opening up, due to the circumstances described before, absolutely new applications for machining centers of the type where—with a view to reducing the re-tooling time—the grippers remain in their position on the tool holders during operation of the tool.

A further advantage of the invention is that the locking projection which enters into the tool holder recess ensures a well-defined rotary position of the tool holder in the gripper even when high tool exchange speeds are set. Further, one has to take into account that when a gripper circumferentially holds a tool holder only minimum rotary motions with relatively low inertial forces may occur. Therefore, the locking projection may be designed relatively small.

Another advantage of the invention is that a manually displaceable actuating element is provided for manually displacing the locking projection out of the recess so that manual loading and unloading of tool holders to and from the gripper may be performed easily, with low time consumption and without the assistance of powered servo-mechanisms.

A further advantage of the invetion lies in the fact that the locking projections are pivoted in a plane arranged perpendicularly to the direction in which tool holders are removed from or inserted to the gripper. These measures ensure that an unwanted pivoting of the locking projections is impossible because a vector of a force may have no component in a direction perpendicular to its own direction.

Further, another advantage of the invention with respect to the locking bar is achieved because the gripper claws may only be entirely closed around a tool holder when the locking projection has fully entered into the associated tool holder recess. Therefore, it is only possible to load the gripper with the tool holder in one predetermined rotary position thereof because in all other rotary positions it is mechanically impossible to close the claws. Therefore, a wrong tool holder rotary position is immediately detected by the person loading the grippers. This is, further, particularly advantageous in those cases where tool holders are equipped with two recesses being arranged on opposite sides of the tool holder circumference. In such standardized tool holders the tool recesses are dimensioned similarly so that an unskilled person could easily confuse one with the other and, hence, insert the tool holder into the gripper in a rotary position being wrong by 180°. However, the two recesses in standardized tool holders are dimensioned slightly differently with respect to their radial depth so that one can easily overcome the aforementioned problem by properly designing the size of the locking projection such as to tightly fit only into the deeper recess thus making introducing into the flatter recess impossible.

Further objects and advantages of the invention will become apparent from the subsequent description of the embodiments and the figures in which.

Figure 1:
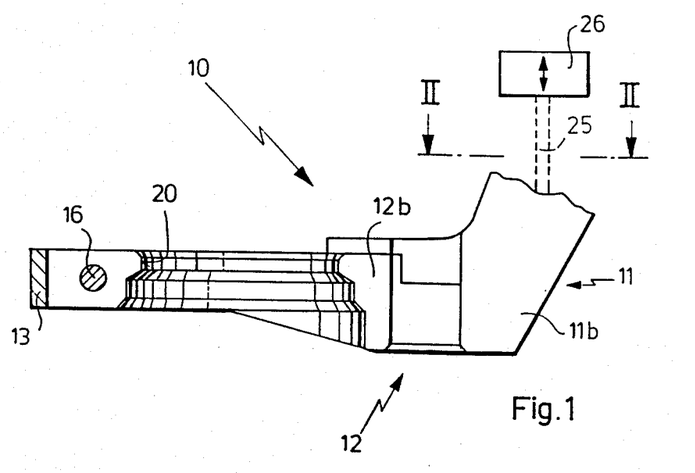
FIG. 1 shows a sectional side view, viewed along line I—I of FIG. 2, of one embodiment of a gripper according to the invention.

In FIG. 1 reference numeral 10 designates generally a gripper of a machine tool not shown on the drawing with the aid of which tool holders can be transferred from a magazine position located at a distance from the spindle stock of the machine tool to a working position lined with the spindle. The gripper 10 comprises an arm 11 ending at its lower end in a substantially horizontal holding part 12. The arm 11 and the holding part 12 are divided, in the area shown in FIG. 1 and 2, along a vertical plane so that sections 11a and 11b of the arm 11 and sections 12a, 12b, of the holding part 12 can be moved apart to enable tool holders to be inserted.

Figure 2:
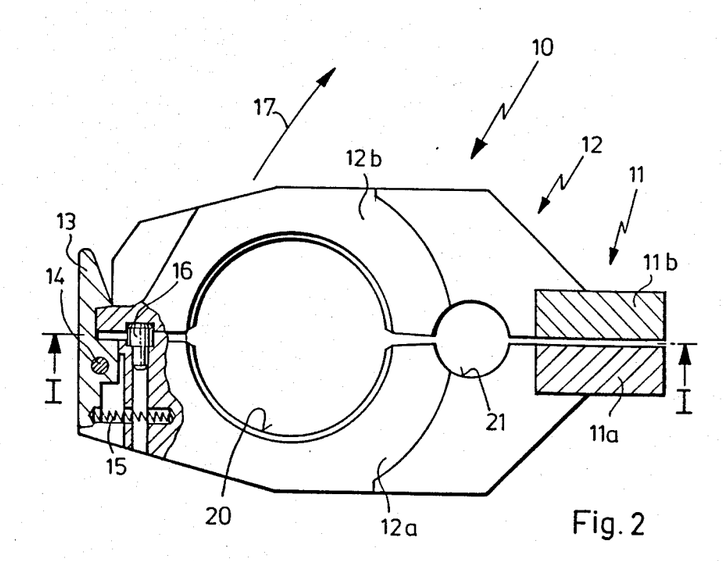
FIG. 2 shows a sectional top view, viewed along line II—II of FIG. 1, of the embodiment shown in FIG. 1 with certain parts cut away.

Section 12a carries a bolt 13 which can be pivoted about a vertical axis 14 against the force of a spring 15. In the closed condition of the holding part 12, as shown in FIG. 2, the bolt 13 coacts with a matching projection on section 12b. A pin 16 provided in section 12b and engaging a fitting bore in section 12a serves for centering the closed assembly.

The holding part 12 is provided with a receiving opening 20, the circumferential profile of which will be described in detail in connection with FIG. 3 and 4. The holding part 12 further comprises a centering bore 21 which can be engaged by matching centering pins on the tool holder in order to guarantee a defined angular position of the tool holders.

In addition, an operative connection indicated at 25 in FIG. 1 leads to setting means 26 by which the holding part 12 can be displaced vertically, i.e. allow the axis of the spindle stock.

Figure 3:
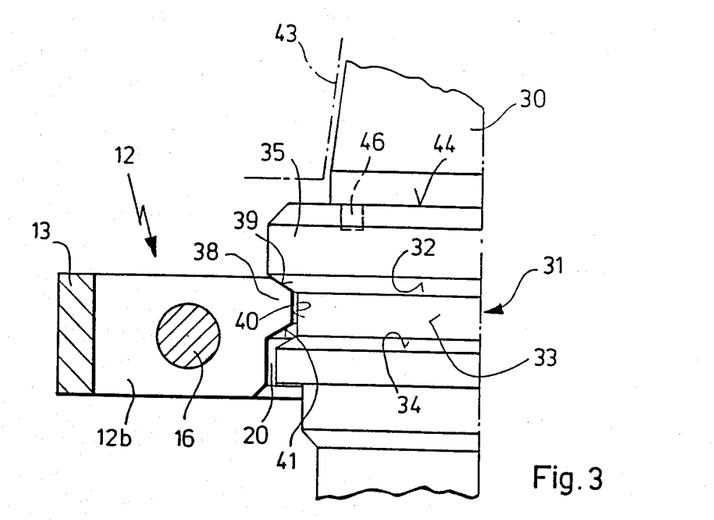
FIG. 3 shows a detail of the gripper according to FIG. 1 in enlarged scale, for illustrating the chucking operation of a tool holder being inserted into a spindle according to the invention.

The operation of the gripper 10 according to the invention will now described with reference to FIG. 3 and 4:

In FIG. 3, a usual standardized tool holder 30 can be seen, designed e.g. according to West German DIN 228 or the applicable ISO-standards. All these standardized tool holders 30 have in common that they are provided with an all-around annular shoulder 35 arranged between an upper conical portion and the tool arranged below. Then annular shoulder 35 is followed in downward direction by a turned groove of trapezoidal cross-section which is defined by an upper conical surface 32, a central cylindrical surface 33 and a lower conical surface 34. The upper conical surface 32 tapers in downward direction.

The receiving opening 20 of the holding part 12 of the gripper 10 is provided with a corresponding inner trapezoidal annular shoulder 38 defined by an upper conical surface 39, a cylindrical surface 40 and a lower conical surface 41. The radial and vertical dimensions of the inner annular shoulder 38 of the receiving opening 20 are sized in such a manner that when the tool holder 30 is inserted into the receiving opening 20 it can be moved therein with a certain radial and vertical play. The angles of inclination, at least of the upper conical surface 32 of the tool holder 30 and upper conical surface 39 of the receiving opening 20, are identical.

FIG. 3 shows the condition in which the tool holder 30 is positioned in the receiving opening 20 in the magazine position and during introduction to a revolving chucking device 43 or spindle of the machine tool. In this position, the upper conical surface 32 of the tool holder 30 is in contact with the upper conical surface 39 of the receiving opening 20 and exerts upon the latter a force corresponding to the weight of the tool holder 30. Accordingly, a frictional contact is established between the tool holder 30 and the holding part 12 depending on the surface finish of the conical surfaces 32 and 39. The force of this frictional contact is higher than the force of the frictional contact existing between a key and an upper end phase 44 of the annular shoulder 45 of the tool holder 30 so that the key can find a corresponding driving groove 46 or recess in the annular shoulder 35 without any delay to establish a form-locking driving relationship between the rotating spindle and the tool holder.

Figure 4:
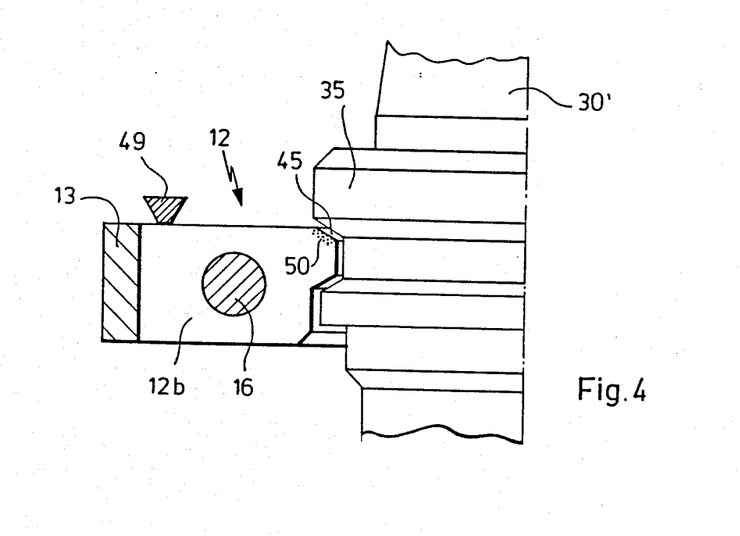
FIG. 4 is a representation similar to FIG. 3, but showing another phase of the chucking operation.

It is now provided that when the tool holder 30 is brought into its working position in the revolving chucking device 43 the upper conical surface 32 of the annular shoulder 35 is lifted off the upper conical surface 39 of the receiving opening 20, and an air gap 45 is formed at this point, as indicated in FIG. 4. Consequently, the tool holder, being designated by reference numeral 30' in this position, is no longer mechanically connected, in its working position, with the holding part 12 so that it is permitted to rotate freely, without any friction, in the revolving chucking device 43 or spindle of the spindle stock, even at extremely high speeds.

The lifting movement of the tool holder 30 relative to the holding part 12 can be effected, as illustrated in FIG. 4, by providing a stationary vertical stop 49 and selecting its position in such a manner that the holding part 12 runs up against the stop 49 shortly before it reaches the working position, whereupon suitable chucking means of the revolving chucking devices 43 act to lift the tool holder 30 a little upwardly into the working position with the result that the air gap 45 is formed.

Alternatively, or as a supporting measure, it is, however, also possible—as has been explained already with reference to FIG. 1—to move the holding part 12 upwardly into the working position of the tool holder 30 by the setting means 26, and to lower it a little, after locking of tool holder 30 in the revolving chucking 43, so that the air gap 45 is formed in this case, too.

As an additional measure supporting the object to be achieved by the present invention, it is finally possible to provide the upper conical surfaces 32, 39 with a friction lining 50 to ensure maximum frictional contact between the tool holder 30 and the holding part 12 in the position shown in FIG. 3.

Figure 5:
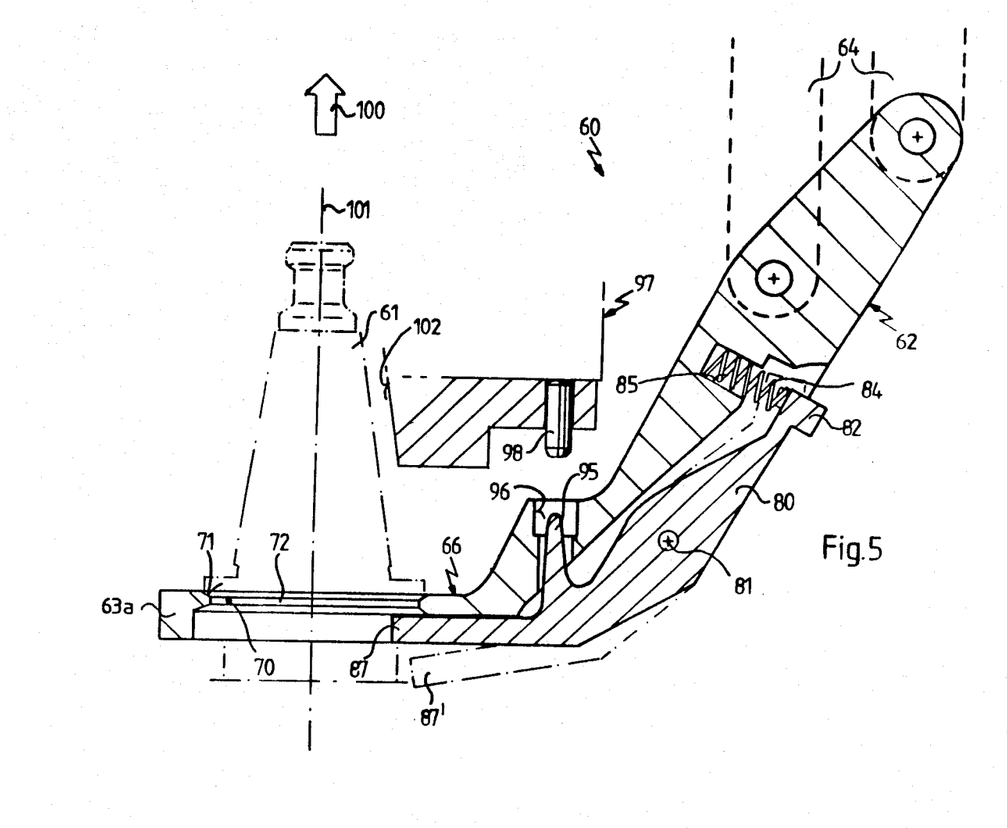
FIG. 5 is a side view, partially cut away, showing an arm and a gripper of a machine tool according to the invention.
Figure 6:
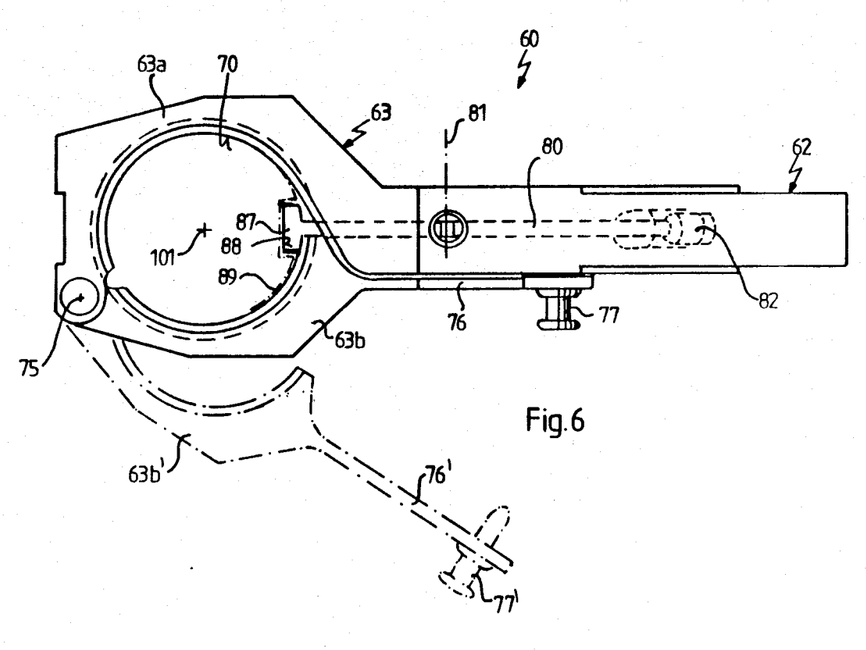
FIG. 6 is a top view on the arrangement of FIG. 5.

FIG. 5 and 6 show another embodiment of the invention where 60, as a whole, designates a tool exchange mechanism, used to transfer tool holders 61 in a drilling and milling machining center for performing various machining operations on work-pieces.

Tool holder 60 is provided with an arm 62 having a gripper 63 at its free end for circumferentially grasping tool holders 61. Movements of the tool exchange mechanism 60 may be performed by means of parallel rods being attached to arm 62 as is known in the prior art. Any of the tool holders used in the machine tool is equipped with its own arm and one of these arms is pivoted in a direction to the spindle depending on the particular tool required.

As can clearly be taken from FIG. 6, gripper 63 is provided two claws 63a, 63b, defining a circular receiving opening 70. The arrangement is designed such that claws 63a, 63b each form a semi-circular section of receiving opening 70. As can be taken from FIG. 1, claws 63a, 63b are provided with a circumferential profile 71 that is adapted to a standardized annular groove of tool holder 61 with a certain play. Tool holder 61, therefore is axially fixed in gripper 63 whereas it may rotate freely, as discussed above with respect to the other embodiments of the invention.

It goes, however, without saying that instead of an arrangement with profile 71 and annular groove 72 other rotational connections may be used between tool holder 61 and gripper 63, e.g. in the form of a ball-bearing, a roller-bearing or the like, as known per se in the art.

In order to load tool holders 61 into gripper 63, claws 63a, 63b have to be pivoted from the position indicated in FIG. 6 in solid lines, e.g. by pivoting them about an axis 75 which extends perpendicularly to the plane of FIG. 6. FIG. 6, further, shows a second position of the claws in dash-dot-lines and indicated by reference numerals 13b'. As one can easily seen, when claw 63b is sufficiently pivoted relative to claw 13a, being rigidly attached to gripper 13, a tool holder 61 may be inserted into receiving opening 70 and, then, may be fixed by closing claws 63a, 63b. The direction of loading or unloading tool holder 61 lies in the plane of FIG. 6.

For opening or closing claws 63a, 63b, claw 63b is provided with an extension 76 which, in turn, is provided at its free end with a push-button 77. Push-button 77 can be designed as a ball-point pen gear, such that push-button 77, when closing claws 63a, 63b is introduced in a form-locking relationship into a respective opening of arm 62 and, further, by again pressing push-button 77 this form-locking relationship may be unlocked for again opening claws 63a, 63b.

As one can clearly see from FIG. 5, arm 62 is equipped with a locking lever 80 which may be pivoted about an axis 81 extending perpendicularly to the plane of FIG. 1. An actuating button 82 is provided at the upper free end of the two-armed locking lever 80. The actuating button 82, in turn, is connected with a spring 84, the other end of which is arranged in a blindhole 85 of arm 62. In a residual position, i.e. when spring 84 is relaxed, locking lever 80 is in the position indicated in FIG. 5 by solid lines. In this position actuating button 82 projects from the rear side of arm 62.

Figures 7, 8:
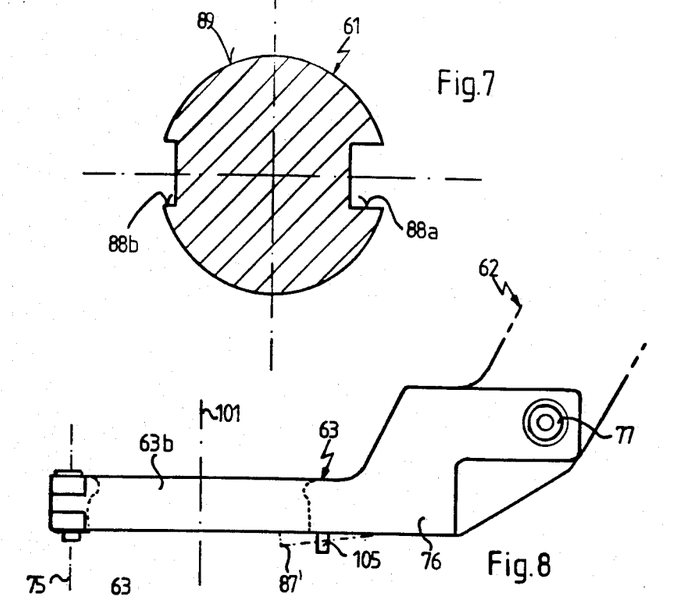
FIG. 7 is a radial cross-section through a standardized tool holder as used in connection with the present invention.
FIG. 8 is a representation similar to that of FIG. 5 for another embodiment of the present invention.

At the other free end of the other arm of locking lever 80 a locking projection 83 is provided which, in the representation of FIG. 7. has the shape of a T. Locking projection 87 is dimensioned such that it snugly fits into a recess 88 provided at the circumference of tool holder 61.

As one can see from FIG. 3, tool holders 61 of the kind used in connection with machining centers according to the invention are provided with two recess 88a, 88b on their circumference 89, the recesses 88a, 88b being diametrically spaced with respect to each other. One of the recesses, namely recess 88a in FIG. 8 is made radially deeper than the other recess 88b. Locking projection 87 is dimensioned such that it fully fills radially deeper recess 88a. This is the case in the residual position of locking lever 80, indicated in the solid lines in FIG. 5.

From FIG. 5 one can further take that locking lever 80 in its lower lever arm is provided with a further upwardly directed projection 95 between the axis 81 and locking projection 87. Projection 95 extends through a bore 96 in arm 62 and is, therefore, accessible from above.

A spindle housing 97 of the machine tool is provided with a fixed stop 98 being shaped as a downwardly extending bolt. The tool exchanging mechanism 60 is moved upwardly in the direction of arrow 100 of FIG. 5 or, vice versa, the spindle is moved downwardly, for introducing tool holder 61 with its standardized cone into a receiving opening 92 of the rotating conical receiving opening of the spindle along axis 91 of tool holder 61. Projection 95 will come into contact with stop 98 so that during further displacement of tool exchange mechanism 60 in an upward direction locking lever 80 in FIG. 5 will be rotated in a counter-clockwise direction. This is done against the force of spring 84 with the effect that locking projection 87 will be moved from its solid line position in FIG. 5 into a dash-dot-line position indicated by numeral 37' in FIG. 5. In this position locking projection 37' is out of contact with recess 88a such that tool holder 61 may now freely rotate about its axis 101.

In this way it is achieved that during chucking of tool holder 61 into rotating receiving opening 102 of the spindle tool holder 61 is unlocked with respect to its rotary position without the need of any servo-actuated installations.

If, on the other handside, during unloading of the magazine of the machine tool a tool holder 61 is to be taken from gripper 63, one has first to actuate push-button 27 and then pivot claw 63b of gripper 63 away from claw 63b. In this position tool holder 61 may not yet be withdrawn from gripper 63 because locking projection 87, the pivotal plane of which extends perpendicularly to the direction of withdrawal of tool holder 61 does not allow to do so. The user of the machine tool now has to actuate actuating button 82 of locking lever 80, thus pivoting locking lever 80 into the dash-dot-line position of FIG. 5. Then tool holder 61 may be easily grasped with the other hand withdrawn from claw 63a of gripper 63. When reloading gripper 63 with another tool holder, the same steps have to be effected in opposite sequence.

Figure 9:
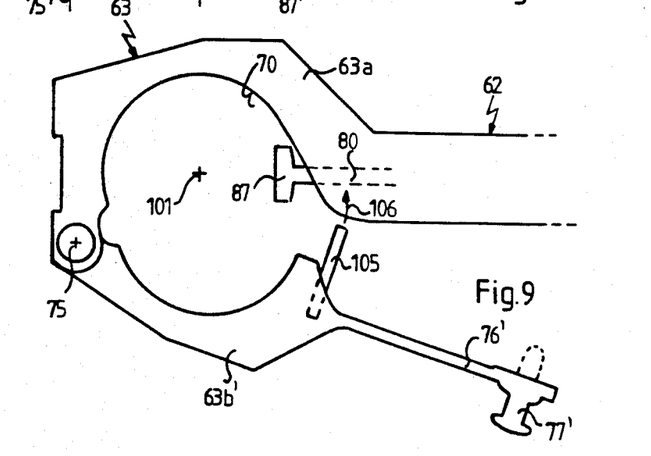
FIG. 9 is a top view on the arrangement of FIG. 8.

FIG. 8 and 9 show how one can assure that locking projection 87 has effectively penetrated into corresponding recess 88a.

For this purpose claw 63b at its underside is provided with a locking bar 105, the path of displacement of which during closing of claws 63a, 63b intersects the path of displacement of locking lever 80 when the latter is pivoted about axis 81. If locking lever 80 is in the solid line position of FIG. 5, its underside including locking projection 87 will be flush with the underside of gripper 63. In this position claw 63b may be pivoted in the direction of gripper 63 and claws 63a and 63b may be closed because the upper side of locking bar 105 is also flush with the underside of gripper 63.

If, however, locking projection 87 is in the dash-dot-line position 37' of FIG. 5 and 8, where it projects above the underside of gripper 63, i.e. because tool holder 61 was erroneously inserted with an error of 180°, where locking projection 87 cannot penetrate into flatter recess 88b, gripper 63 cannot be closed by pivoting claw 63b, because projecting locking projection 87' acts as an obstacle for locking bar 105 and stops its displacement in the direction of arrow 106 in FIG. 9. In that case the user of the machine tool will immediately become aware that tool holder 61 was not inserted correctly because he cannot close gripper 63 against the mechanical obstacle.

It goes without saying that various modifications and alterations of the aforementioned embodiments are possible without leaving the scope of the present invention. Further, any of the described elements may be used in the described combination or in other combinations or alone without departing from the scope of the present invention.

We claim:

1. A machine tool, comprising
a plurality of tool holders having an upper conical insertion section, an intermediate circumferential gripping section and a lower tool section, said gripping section being provided with an annular shoulder having a downwardly tapering lower conical frictional surface;
a rotating spindle having a conical receiving opening for inserting one of said tool holders therein and having pulling means for pulling-in and securing said tool holder with said inserting section into said receiving opening;
a magazine containing a plurality of said tool holders;
transfer means for transferring said tool holders from said magazine to said receiving opening and vice versa;
gripping means attached to said transfer means for gripping said tool holders by said gripping section when being in said magazine and rotatably holding said tool holders when inserted, pulled-in and secured to said receiving opening and working on a workpiece, said gripping means being provided with a downwardly tapering upper conical frictional surface extending parallel to said gripping section lower conical frictional surface;
control means for actuating said pulling means and said transfer means such that said frictional surfaces are in contact with each other during insertion of said inserting section into said receiving section to exert a braking force on said tool holder against rotation thereof, whereas said frictional surfaces are separated from each at an axial distance during securing said tool holder in said receiving opening for allowing free rotation thereof during said working on said workpiece.

2. The machine tool of claim 1 wherein a stationary stop is arranged on said spindle adjacent said receiving opening for stopping axial movement of said gripping means during insertion of said inserting section while further axially pulling said inserting section with said pulling means to separate said frictional surfaces from each other.

3. A machine tool, comprising
a plurality of tool holders having an upper conical insertion section, an intermediate circumferential gripping section and a lower tool section, said gripping section being provided with a recess in a circumference thereof;
a rotating spindle having a first conical receiving opening for inserting one of said tool holders therein and having pulling means for pulling-in and securing said tool holder with said inserting section into said first receiving opening, a stationary stop being arranged on said spindle adjacent said first receiving opening;
a magazine containing a plurality of said tool holders;
transfer means for transferring said tool holders from said magazine into said first receiving opening and vice versa;
gripping means attached to said transfer means for gripping said tool holders by said gripping section when being in said magazine and rotatably holding said tool holders when inserted, pulled-in and secured into said first receiving opening and working on a workpiece, said gripping means being provided two claws being arranged pivotally about a first axis with respect to each other and defining an essentially circular second circumferential receiving opening for said gripping section;
locking means arranged in said gripping means for keeping said tool holder in a predetermined rotational position with respect to said gripping means, said locking means comprising a spring-biased locking lever pivotable about a second axis and having a first section entering into said recess of said tool holder when said locking lever is in a first working position with said spring relaxed said locking lever further having a second section coming into contact with said stationary stop when said insertion section is introduced into said first receiving opening to pivot said locking lever against said spring into a second working position to withdraw said first section from said recess, said locking lever further having a third section being manually displaceable to also withdraw said first section from said recess, said third section being distant from said first section.

4. The machine tool of claim 3 wherein said tool holder is inserted into said gripping means along a predetermined direction when said claws are spread apart and said first section is pivoted in a plane being arranged perpendicularly to said predetermined direction.

5. The machine tool of claim 3 wherein one of said claws is provided with a locking bar having a path of displacement when said one claw is pivoted about said first axis, said path of displacement intersecting said locking lever except when said locking lever is in said first working position.

6. A machine tool, comprising
a plurality of tool holders having an upper conical insertion section, an intermediate circumferential gripping section and a lower tool section, said gripping section being provided with a recess in a circumference thereof, and being further provided with an annular shoulder having a downwardly tapering lower conical frictional surface;
a rotating spindle having a first conical receiving opening for inserting one of said tool holders therein and having pulling means for pulling-in and securing said tool holder with said inserting section into said first receiving opening, a first stationary stop being arranged on said spindle adjacent said first receiving opening;
a magazine containing a plurality of said tool holders;
transfer means for transferring said tool holders from said magazine into said first receiving opening and vice versa;
gripping means attached to said transfer means for gripping said tool holders by said gripping section when being in said magazine and rotatably holding said tool holders when inserted, pulled-in and secured into said first receiving opening and working on a workpiece, said gripping means being provided with two claws being arranged pivotably about a first axis with respect to each other and defining an essentially circular second circumferential receiving opening for said gripping section, said gripping section further comprising a downwardly tapering upper conical frictional surface extending parallel to said gripping section lower conical frictional surface;
control means for actuating said pulling means and said transfer means such that said frictional surfaces are in contact with each other during insertion of said inserting section into said first receiving section to exert a braking force on said tool holder against rotation thereof, whereas said frictional surfaces are separated from each other at an actual distance during securing said tool holder in said first receiving opening for allowing free rotation thereof during said working on said workpieces;

locking means arranged in said gripping means for keeping said tool holder in a predetermined rotational position with respect to said gripping means, said locking means comprising a spring-biased locking lever pivotable about a second axis and having a first section entering into said recess of said tool holder when said locking lever is in a first working position with said spring relaxed, said locking lever further having a second section coming into contact with said stationary stop when said insertion section is introduced into said first receiving opening to pivot said locking lever against said spring into a second working position to withdraw said first section from said recess, said locking lever further having a third section being manually displaceable to also withdraw said first section from said recess, said third section being distant from said first section.

7. The machine tool of claim 6 wherein a second stationary stop is arranged on said spindle adjacent said receiving opening for stopping axial movement of said gripping means during insertion of said inserting section while further axially pulling said inserting section with said pulling means to separate said frictional surfaces from each other.

8. The machine tool of claim 6 wherein said tool holder is inserted into said gripping means along a predetermined direction when said claws are spread apart and said first section is pivoted in a plane being arranged perpendicularly to said predetermined direction.

9. The machine tool of claim 6 wherein one of said claw is provided with a locking bar having a path of displacement when said one claw is pivoted about said first axis, said path of displacement intersecting said locking lever except when said locking lever is in said first working position.

* * * * *